United States Patent [19]

Bronnert

[11] Patent Number: 4,913,397
[45] Date of Patent: Apr. 3, 1990

[54] PRESSURE RESPONSIVE DIAPHRAGM CONTROL VALVE

[76] Inventor: Hervé X. Bronnert, 21495 Partridge Ct., Brookfield, Wis. 53005

[21] Appl. No.: 300,263

[22] Filed: Jan. 19, 1989

[51] Int. Cl.[4] .......................................... F16K 31/145
[52] U.S. Cl. ..................................... 251/61.1; 251/367
[58] Field of Search ............................... 251/61.1, 367

[56] References Cited

U.S. PATENT DOCUMENTS 3,083,943 4/1963 Stewart, Jr. et al. ............... 251/61.1
4,699,137 10/1987 Schroeder ........................... 251/61.1

FOREIGN PATENT DOCUMENTS 899236 6/1962 United Kingdom ............... 251/61.1

*Primary Examiner*—A. Michael Chambers
*Attorney, Agent, or Firm*—Foley & Lardner

[57] ABSTRACT

A diaphragm control valve including a casing having an opening in one side. A cylindrical pipe mounted in a coaxial relation to the casing, and having a valve seat at one end. A flexible diaphragm is symmetrically mounted in the casing in a spaced relation to the valve seat and has a diameter larger than the diameter of the valve seat. A cover is provided on one end of the casing to form a pressure chamber on one side of the diaphragm. Air is admitted under pressure into the chamber to move the diaphragm toward the valve seat to control the flow of fluid through the casing. A seal is provided between the cover and casing to seat the diaphragm into the casing.

6 Claims, 2 Drawing Sheets

PRESSURE RESPONSIVE DIAPHRAGM CONTROL VALVE

BACKGROUND OF THE INVENTION

1. Field of the Invention

The present invention relates to pressure responsive diaphragm type control valves for controlling the flow of fluid. More particularly, the valve includes an independent diaphragm which is responsive solely to the differential pressure between the controlling air pressure and the pressure of the controlled fluid that flows through the valve.

2. Description of the Prior Art

Diaphragm type control valves are used to control all kinds of fluids. Generally, the valve includes a diaphragm for supporting a valve element for movement into and out of engagement with a valve seat. A valve stem is connected to the valve element to guide the movements of the valve element into and out of engagement with the valve seat. Springs are often mounted on the valve stem to aid in opening or closing of the valve element. The movement of the diaphragm is, therefore, restricted by the mess of the valve stem, its friction, and the mass of the valve element and the bias of the spring.

SUMMARY OF THE INVENTION

The diaphragm type back pressure valve according to the present invention is operated by balancing the air pressure on one side of the diaphragm with the product flow pressure on the other side of the diaphragm. The air pressure surface area of the diaphragm is larger than the surface area on the controlled portion of the product side of the diaphragm so that the diaphragm is responsive to small variations in air pressure to control the flow and/or pressure of the inlet supplied.

The diaphragm for the valve is completely symmetrical which allows for the use of both elastic type materials and resilient metal type materials.

A particular advantage of the valve is the versatility of the valve in that it can be used as a back pressure valve generating and controlling a given pressure of the incoming fluid; as an on-off air operated two way valve and as a combination of the above.

A principal feature of the invention is that the only moving part in the valve is the diaphragm which enhances the sensitivity of the valve.

A further feature of the invention is the provision of a diaphragm valve which is symmetrically balanced and, therefore, can be controlled by low air pressure with greater sensitivity.

A further feature of this invention is the ability to control large capacity flow of 150 gallons per minute or more, depending on size, with very high sensitivity particularly on the low pressure range of 1 to 25 psig.

Another feature of the valve is the ability to control pressure from a positive pressure feed pump; control flow and pressure from a centrifugal pump; and control flow and pressure with a pressurized tank feeding it.

Other principal features and advantages of the invention will become apparent to those skilled in the art upon review of the following detailed description, claims and drawings.

Figure 1:
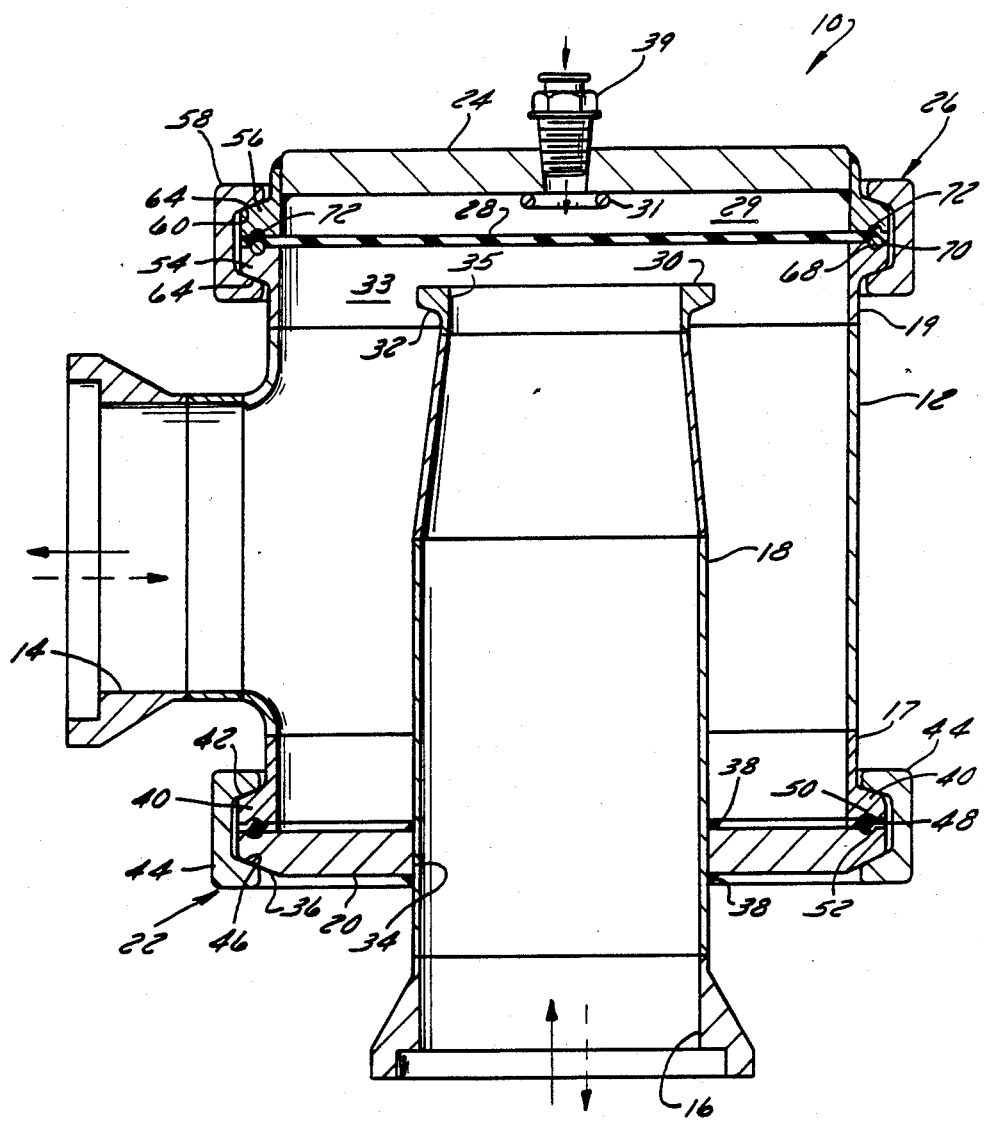
FIG. 1 is a side elevation view showing the diaphragm located in a semi-open position with respect to the valve seat.
Figure 3:
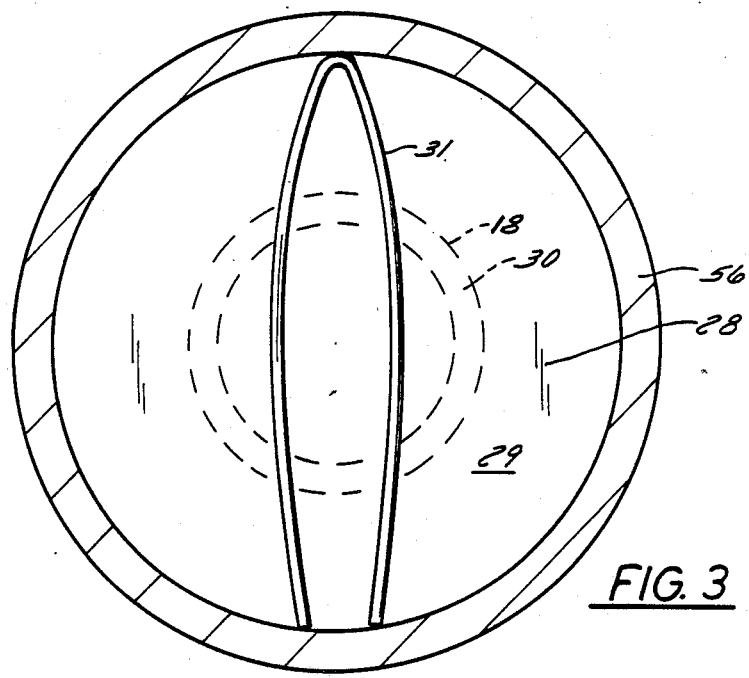
FIG. 3 is a view taken on line 3—3 of FIG. 2 showing the hair pin spring for preventing closing of the air inlet or damage to the diaphragm from it, if this item is needed.

Before describing one embodiment of the invention in detail, it is to be understood that the invention is not limited in its application to the details of construction, and the arrangement of the components set forth in the following description and illustrated in the drawing. The invention is capable of other embodiments and of being practiced or carried out in various ways. Also, it is to be understood that the phraseology and terminology employed herein is for the purposes of description and should not be regarded as limiting.

DETAILED DESCRIPTION OF A PREFERRED EXEMPLARY EMBODIMENT

As seen in FIG. 1 of the drawings, the valve 10 includes a housing or valve body 12 having an outlet 14 on one side of the valve 12 and an inlet 16 at one end 17 of the valve body 12 disposed at a right angle to the outlet 14. Means are provided in the housing for forming a valve seat 30 in the housing intermediate the outlet 14 and inlet 16. Such means is in the form of a cylindrical pipe 18 which is supported in the housing 12 by a cover plate 20 seated on the end 17 of the housing 12.

The cover plate 20 is secured to the housing 12 by means of a clamp assembly 22. The valve body 12 is closed on the other end 19 by means of a cap 24 which is also secured to the valve body by means of a clamp assembly 26. Although tri-clover style clamp assemblies 22 and 26 are shown in the drawing, other assemblies may be used such as a cherry burrel assembly.

The cover plate 20 includes a central opening 34 having a diameter greater than the diameter of the cylindrical pipe 18 and a chamfer 36 around the outer edge thereof. The cover plate 20 is secured to the cylindrical pipe 18 by welds 38. The end 17 of the housing 12 is provided with a lip 40 having a chamfer 42.

The cover plate 20 is secured to the lip 40 by a conventional tri-clover type clamp assembly 22 which includes a pair of cylindrical members 44 having a V-shaped groove 46 and hingedly connected together at one end. The members 44 are mounted on the chamfer 36 on the cover 20 and the chamfer 42 on the lip 40 and connected at the other end by means of a clamp (not shown). Means may be provided for sealing the lip 40 to the cover 20. Such means is in the form of a gasket 48 mounted grooves 50 in the lip 40 and groove 52 in cover 20. Although a clamp assembly has been shown and described, this joint could be welded if desired.

Figure 2:
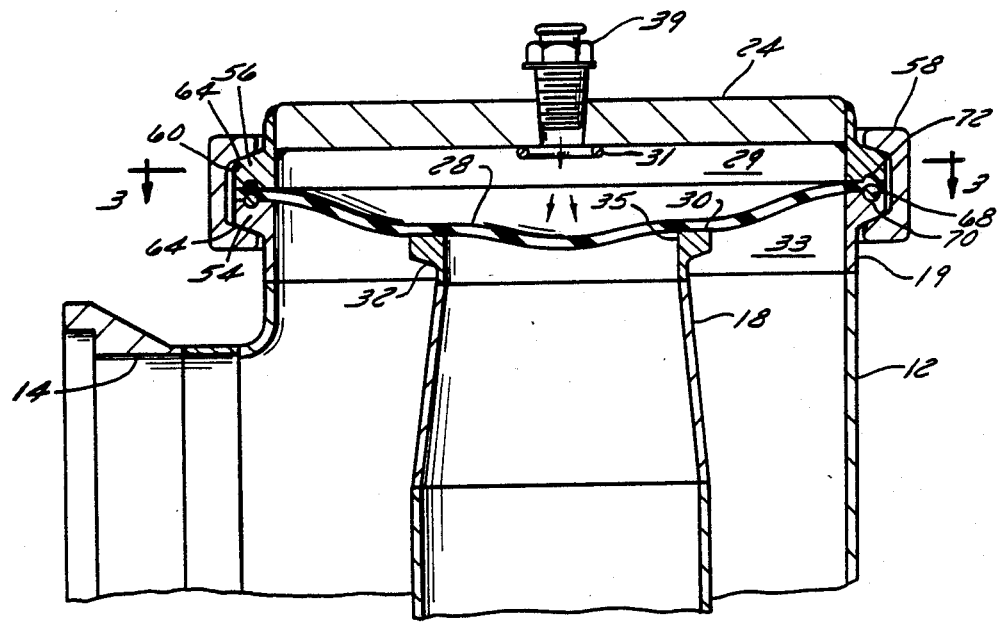
FIG. 2 is an enlarged view of the diaphragm, shown in section, in a closed position with respect to the valve seat.

Flow or pressure of fluid through the tube 18 is controlled by means of a flexible diaphragm 28 which is mounted in a spaced relation to the valve seat 30 provided on the end of a cylindrical ring 32 mounted on the end of the tube 18. The flow of fluid through the tube 18 in either direction of flow is controlled by moving the diaphragm 28 into engagement with valve seat 30 as shown in FIG. 2. Although flow through the valve has been described as flow from the inlet 16 to the outlet 14, it should be noted that flow can also be reversed through the valve as described hereinafter.

The diaphragm 28 is secured in the open end 19 of the valve body 12 between an annular ferrule 54 mounted on the end of the end 19 of valve body 12 and an annular ferrule 56 mounted on the cover 24. The ferrules 54 and 56 are clamped together by means of a conventional tri-clover clamp assembly 26. In this regard, the clamp assembly 26 includes a pair of cylindrical members 58 which are hingedly connected at one end. Each member 58 includes a V-shaped groove 60 that matingly engages the chamfer edges 64 provided on ferrules 54 and 56, respectively. The members 58 are drawn together at the other end by a clamp (not shown).

Means are provided for locking the diaphragm 28 between the ferrules 54 and 56. Such means is in the form of a metal ring 68 provided in a groove 72 in ferrule 56. A corresponding groove 70 is provided in ferrule 54. When the ferrules are clamped together, the diaphragm 28 will be forced into the groove 70 by metal ring 68 locking the diaphragm into the groove 70 and also forming a seal with the ferrule 54.

With this arrangement, the seal on the casing side of the diaphragm will provide an aseptic connection of the diaphragm to the casing. It should be noted that the diaphragm is symmetrically supported by the ferrules 54 and 56 so that an even distribution of force will be provided on actuation of the diaphragm. The diaphragm is prevented from being damaged or from blocking the end of inlet 39 means of a wire loop spring 31 mounted on the inside of cap 24. The diaphragm can be formed from a number of resilient materials such as Viton, Teflon, EPDM, silicon, stainless steel or monel.

In the first or back pressure control mode, the product flows through the opening 16, the valve seat 30 and out through opening 14. The diaphragm 28 is controlled by air under pressure supplied through inlet 39 into chamber 29. The diaphragm 28 will move toward the valve seat 30.

In this regard it should be noted that the diameter of the diaphragm 28 is always longer than the larger diameter of the opening 35 in the valve seat 30. With this arrangement a lower air pressure can be used to control a higher fluid flow pressure from the incoming fluid. The diaphragm can thus be used to control the incoming pressure or flow of the fluid passing through the tube 18. In order to stop the flow of product through the tube 18, the diaphragm must be moved into engagement with the valve seat 30. This is achieved by merely increasing the pressure in chamber 29 so that the pressure per square inch on the chamfer side of the diaphragm exceeds the fluid flow pressure per square inch on the flow side of the diaphragm. As an example, a diaphragm having a diameter of two inches would require approximately one fourth the air pressure to close a valve seat of one inch in diameter.

When the valve is used to control the flow of fluid from the opening 14 through the opening 35 to tube 18, there is a general pressure balance which is different from use of the diaphragm as in the first direction. With this type of flow, the produce pressure fills the body of the valve 12 all around the tube 18 and acts on the diaphragm 28 only in the area 33 between the valve seat and the tri-clover style clamp 26. The air pressure to balance this fluid pressure needs to be higher pressure than the first approach since the incoming product in the housing does not come directly straight against the diaphragm but at a 90° angle thereto.

This geometry brings a different action/reaction between the incoming fluid and the valve. The valve diaphragm is not directly subjected to quick pressure/flow changes since it is often positioned at 90° with the fluid inlet. In addition, the incoming fluid impact is broken up on the control pipe 18 and the internal body of the valve.

It will be understood that the foregoing description is of a preferred exemplary embodiment of the present invention and that the invention is not limted to the specific forms shown. Modifications may be made in design and arrangement thereof within the scope of the present invention, as expressed in the appended claims.

I claim:

1. A diaphragm valve comprising:
   a tubular casing having an opening in one side;
   a cylindrical pipe mounted in said casing in a coaxial relation to said casing and in a perpendicular relation to said opening;
   said pipe forming a fluid flow path through said casing to said opening;
   a valve seat formed on one end of said pipe;
   a flexible diaphragm mounted in said casing in a spaced relation to said valve seat;
   a cap mounted on said casing to form a pressure chamber on one side of said diaphragm, said casing including a ferrule around said one end of said casing and a groove in said ferrule coaxial with said casing, said cover including a ferrule having a groove corresponding to said groove in said casing ferrule and a ring seated in said groove in said ferrule in said cover whereby said ring will seat said diaphragm in said groove in said ferrule in said casing to form an aseptic seal between said casing and said diaphragm;
   and means for admitting air under pressure into said chamber to move said diaphragm into engagement with said valve seat.

2. The valve according to claim 1 wherein said diaphragm is symetrically arranged with respect to said valve seat.

3. The valve according to claim 2 wherein said diaphragm has a diameter larger than the diameter of said valve seat.

4. A diaphragm valve comprising:
   a tubular casing having an opening in one side;
   a cylindrical pipe mounted in said casing in a coaxial relation to said casing and in a perpendicular relation to said opening;
   said pipe forming a fluid flow path through said casing to said opening;
   a valve seat formed on one end of said pipe;
   a flexible diaphragm mounted in said casing in a spaced relation to said valve seat;
   a cap mounted on said casing to form a pressure chamber on one side of said diaphragm, means for sealing said diaphragm to said casing, said sealing means comprising a groove in said one end of said casing, a ring in said groove in said casing and means for securing said cap to said casing with said ring aligned with said groove whereby said diaphragm is seated on said cap;
   and means for admitting air under pressure into said chamber to move said diaphragm into engagement with said valve seat.

5. The valve according to claim 4 wherein said diaphragm is symmetrically arranged with respect to said valve seat.

6. The valve according to claim 5 wherein said diaphragm has a diameter larger than the diameter of said valve seat.

* * * * *